Patented July 3, 1945

2,379,606

UNITED STATES PATENT OFFICE 2,379,606

CYCLOPARAFFIN POLYMER COATING COMPOSITIONS

Robert C. Swain, Riverside, and Pierrepont Adams, Stamford, Conn., assignors to American Cyanamid Company, New York, N. Y., a corporation of Maine No Drawing. Application September 25, 1940, Serial No. 358,282

4 Claims. (Cl. 260—42)

This invention relates to coating compositions containing hydrocarbon polymers of the cycloparaffin type and melamine-formaldehyde resins.

An object of this invention is to improve the physical and chemical properties of coating compositions containing hydrocarbon polymers of the cycloparaffin type, e. g., color stability, resistance to solvents, etc.

Another object of this invention is to provide compositions containing hydrocarbon polymers of the cycloparaffin type and compatible proportions of compatible melamine-formaldehyde resins.

These and other objects are attained by blending one part of hydrocarbon polymer of the cycloparaffin type with about one part or more of a melamine-formaldehyde resin which has been alkylated with a butyl alcohol and wherein the molal ratio of formaldehyde to melamine is at least about 4:1.

The following examples in which the proportions are in parts by weight are given by way of illustration and not in limitation. The cycloparaffin polymer used in the following examples is one obtained by hydrogenation of essentially indene polymers (or polymers of mixtures of indene and some coumarone) sold under the trade name of "Nevillite #2," having a melting point between about 145-155° C. and being prepared in accordance with the procedure set forth by Carmody et al. in "Industrial and Engineering Chemistry," vol. 32, pages 684-692, N. B. page 691.

Example 1

| | Parts |
|---|---|
| Melamine-formaldehyde resin "A" | 50 |
| Cycloparaffin polymer ("Nevillite #2") | 50 |

A composition containing these ingredients is prepared by admixing 100 parts of melamine-formaldehyde resin "A" solution (50% resin) with 100 parts of "Cycloparaffin polymer stock solution" (containing 50% of cycloparaffin polymer and 50% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 75 |
| Cycloparaffin polymer ("Nevillite #2") | 25 |

A composition containing these ingredients is prepared by admixing 150 parts of melamine-formaldehyde resin "B" solution (50% resin) with 50 parts of "Cycloparaffin polymer stock solution." Films of the composition are applied to metal objects and baked at a temperature of about 135° C. for about one-half hour. A clear, tough film is formed.

Example 3

| | Parts |
|---|---|
| Melamine-formaldehyde resin "A" | 90 |
| Cycloparaffin polymer ("Nevillite #2") | 10 |

A composition containing these ingredients is prepared by admixing 180 parts of melamine-formaldehyde resin "A" solution (50% resin) with 20 parts of "Cycloparaffin polymer stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "C" | 50 |
| Cycloparaffin polymer ("Nevillite #2") | 50 |

A composition containing these ingredients is prepared by admixing 100 parts of melamine-formaldehyde resin "C" (50% resin) solution with 100 parts of "Cycloparaffin polymer stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "C" | 90 |
| Cycloparaffin polymer ("Nevillite #2") | 10 |

A composition containing these ingredients is prepared by admixing 180 parts of melamine-formaldehyde resin "C" solution (50% resin) with 20 parts of "Cycloparaffin polymer stock solution." Films of the composition are applied to metal objects and baked at a temperature of about 135° C. for about one-half hour. A hard, transparent film is produced.

Preparation of melamine-formaldehyde resin "A"

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldhyde resin "B"*

| | Parts |
|---|---|
| Melamine (1 mol) | 126 |
| Formaline (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Cycloparaffin polymers suitable for use according to our invention may be prepared by hydrogenating indene polymers, indene-coumarone polymers, coumarone polymers, etc. and they may also be produced by polymerizing various mixtures of unsaturated compounds of the cyclohexane series and the cyclopentane series. Such unsaturated materials may contain not only mono-olefines, but diolefines and they may be polymerized by the use of suitable catalysts such as boron trifluoride, aluminum chloride, sulfuric acid, etc. Preferably products suitable for our invention are essentially hydrogenated indene polymers having a melting point between about 145° and about 160° C. The preparation of products of this type is described by Carmody et al. loc. sit., Patents Nos. 2,128,985, 2,128,984, 2,139,722 (see especially Example 1) and 2,152,533.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. The condensation may be carried out either with or without an acid catalyst and in some instances basic catalysts may desirably be utilized.

The melamine-formaldehyde resins vary slightly according to minor variations of control during their production and in some instances small proportions of a suitable solvent material, e. g., benzene, xylene, toluene, acetone, etc., may be added to the original solutions of hydrocarbon polymers and melamine-formaldehyde resin in order to produce perfectly clear solutions if such solutions are not originally obtained.

While formaldehyde has been used in the previous examples, it will be obvious that other aldehydes such as the various polymers of formaldehyde, e. g., paraformaldehyde, or substances which yield formaldehyde may be used in place of part or all of the formaldehyde.

The melamine-formaldehyde resins may be alkylated with n-butyl alcohol as in the above examples or they may be alkylated with other butyl alcohols or mixtures of butyl alcohols. Melamine-formaldehyde resins which are alkylated with alcohols other than the butyl alcohols may also be blended with hydrocarbon polymers of the cycloparaffin type in some instances. We have found that a melamine-formaldehyde resin having a ratio of formaldehyde to melamine of about 5:1 and alkylated with hexyl alcohol is compatible with up to about 10% of the hydrocarbon polymer. Similarly, benzylated melamine-formaldehyde resins having the same ratio are compatible with the hydrocarbon polymer in proportions up to about 75% of the melamine resin. The percentage composition in each instance in this paragraph is on a total solids weight basis. The term "alkylated melamine-formaldehyde resin" is intended to denote compositions which are reacted with an alcohol.

As indicated by the above examples, hydrocarbon polymers of the cycloparaffin type have been found to be compatible with melamine-formaldehyde resins wherein the molal ratio of formaldehyde to melamine is about 4:1 up to 6:1 if not more than about 1 part of the hydrocarbon polymer is blended with 1 part of melamine-formaldehyde resin. In some instances, other ratios of formaldehyde to melamine may be employed. For example, a melamine-formaldehyde resin which is butylated and wherein the molal ratio of formaldehyde to melamine is about 3:1 is compatible with the hydrocarbon polymer in proportions up to about 10% (total solids weight basis). Relatively small proportions of melamine-formaldehyde resins wherein the molal ratio of formaldehyde to melamine is about 6:1 are compatible with the hydrocarbon polymers of the cycloparaffin type as described and claimed in our copending application Serial No. 358,283 entitled "Coating compositions containing cycloparaffin type polymers." We have found that resins wherein the ratio of formaldehyde to melamine is 5:1 or less are generally incompatible with hydrocarbon polymers of the cycloparaffin type in proportions less than about 50% (total solids weight basis). While ratios of formaldehyde to melamine higher than 6:1 may be used, it is generally undesirable inasmuch as formaldehyde is lost during the curing so that usually the product in its cured condition does not contain more than about 6 mols of formaldehyde to 1 mol of melamine.

As indicated above the hydrocarbon polymers of the cycloparaffin type are blended with the melamine-formaldehyde resins in proportions ranging upwards from about 50% (total solids weight basis) of melamine resin.

Our compositions may be used in admixture with other resinous compositions, e. g., urea-formaldehyde resins, phenol-formaldehyde resins, nitrocellulose, ester gum, etc. They may also be used in drying oil vehicles such as linseed oil and the like.

A wide variety of plasticizers may be incorporated into our products such as the alkyl phthalates, tricresyl phosphate, some modified alkyds, etc.

Various fillers, pigments, dyes and lakes may be added to our compositions, e. g., lithopone, zinc oxide, titanium oxide, ferric oxide, Prussian blue, toluidine red, malachite green, mica, ground glass, glass fibers, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Films of our mixed hydrocarbon polymers and alkylated melamine-formaldehyde resins are useful in varnishes, lacquers and other coating compositions. Such compositions are very resistant to corrosive and weathering conditions, as well as being resistant to acid and alkali, thereby rendering them especially suitable for use in coating compositions, particularly concrete enamels and various interior finishes. Our compositions are substantially odorless and tasteless and therefore are of use as protective coatings for food and beverage containers.

One advantage of our melamine-formaldehyde resin-hydrocarbon polymer mixtures of especial importance is in the reduced solubility and thermoplasticity as compared to compositions containing only cycloparaffin type polymers.

Obviously many modifications and variations in the processes and compositions described above may be made without departing from the spirit and scope of the invention as defined by the appended claims.

We claim:

1. A coating composition containing a solid hydrocarbon polymer of the cycloparaffin type, obtained by hydrogenating a substance selected from the group consisting of coumarone polymers, indene polymers and mixed coumarone-indene polymers, and a melamine-formaldehyde resin which has been reacted with a butyl alcohol, wherein the molal ratio of formaldehyde to melamine is at least about 4:1 and wherein the ratio of melamine resin to hydrocarbon polymer is at least about 1:1.

2. A coating composition containing a solid hydrocarbon polymer of the cycloparaffin type, obtained by hydrogenating a substance selected from the group consisting of coumarone polymers, indene polymers and mixed coumarone-indene polymers, and melamine-formaldehyde resin which has been reacted with n-butyl alcohol, wherein the molal ration of formaldehyde to melamine is at least about 4:1 and wherein the ratio of melamine resin to hydrocarbon polymer is at least about 1:1.

3. A coating composition containing a solid hydrocarbon polymer of the cycloparaffin type, obtained by hydrogenating materials which are essentially polymerized indene, and melamine-formaldehyde resin which has been reacted with n-butyl alcohol, wherein the molal ratio of formaldehyde to melamine is at least about 4:1 and wherein the ratio of melamine resin to hydrocarbon polymer is at least about 1:1.

4. A coating composition containing a hydrocarbon polymer of the cycloparaffin type, obtained by hydrogenating a substance selected from the group consisting of coumarone polymers, indene polymers and mixed coumarone-indene polymers, and having a melting point between about 145 and 155° C. and melamine-formaldehyde resin which has been reacted with n-butyl alcohol, wherein the molal ratio of formaldehyde to melamine is at least about 4:1 and wherein the ratio of melamine resin to hydrocarbon polymer is at least about 1:1.

ROBERT C. SWAIN.
PIERREPONT ADAMS.